(12) United States Patent
Moon et al.

(10) Patent No.: US 6,195,912 B1
(45) Date of Patent: Mar. 6, 2001

(54) APPARATUS FOR ROASTING COFFEE BEANS (75) Inventors: Jung S. Moon, Buffalo Grove; Rong Liu, Wheeling; Alan R. Kelley, Barrington, all of IL (US)

(73) Assignee: Hearthware Home Products Inc., Wheeling, IL (US)

( * ) Notice: Subject to any disclaimer, the term of this patent is extended or adjusted under 35 U.S.C. 154(b) by 0 days.

(21) Appl. No.: 09/303,709

(22) Filed: Apr. 30, 1999

(51) Int. Cl.[7] ....................................................... F26B 17/00
(52) U.S. Cl. .................. 34/577; 34/586; 34/136; 34/232; 426/465; 99/421
(58) Field of Search ............................. 34/360, 368, 390, 34/395, 394, 577, 573, 586, 589, 67, 68, 135, 136, 218, 225, 233; 426/465, 466, 467, 523; 99/421 H, 483, 286, 233, 360, 476

(56) References Cited

U.S. PATENT DOCUMENTS

| 4,698,916 | * | 10/1987 | Farber | 34/233 X |
| 5,890,418 | * | 4/1999 | Song | 34/233 X |
| 5,958,494 | * | 9/1999 | Tidland et al. | 426/467 X |
| 5,960,561 | * | 10/1999 | Parodi et al. | 34/218 X |

* cited by examiner

Primary Examiner—Stephen Gravini
(74) Attorney, Agent, or Firm—Wood, Phillips, VanSanten, Clark & Mortimer (57) ABSTRACT An improved apparatus and method for the hot air roasting of coffee beans is provided and includes structure for inhibiting contaminants from entering the hot air stream used in the roasting of coffee beans, structure for obtaining a uniform roast of the coffee beans, unitary structure for mounting a handle to a roasting chamber and removably and releasably mounting a cover to the roasting chamber, structure for initiating a roasting cycle and terminating the roasting cycle for a predetermined cooling period at any point during the roasting cycle, structure for double sealing a cover to a roasting chamber, structure for assembling a vessel, a metallic base, and a plastic mount ring into an integral roasting chamber, structure for releasably and removably mounting a roasting vessel to a main housing, dual filters for preventing the blockage of a hot air stream through a hull and chaff collector, and a "fan based" method for controlling the roasting temperature.

15 Claims, 8 Drawing Sheets

APPARATUS FOR ROASTING COFFEE BEANS

FIELD OF THE INVENTION

This invention relates to apparatus for roasting coffee beans, and more specifically, to relatively small coffee bean roasters that rest on a counter-top or table during operation, such as coffee roasters that are primarily intended for use in the home or for roasting relatively small batches of coffee at a restaurant or coffee shop or for sample cupping.

BACKGROUND OF THE INVENTION

Recent years have seen an explosion of interest in gourmet coffee products and the interest has not been limited to the purchase of coffee-based beverages from vendors who prepare the beverage on premise and purvey it to consumers over the counter. Similarly, the interest has not been limited to gourmet blends, coffee that may be purchased already ground, and then brewed in the home. Many consumers desire the ultimate in freshness and flavor and have taken to roasting their own beans and then grinding them shortly before the coffee brewing process is initiated.

As a consequence, there is an increasing market for coffee roasting apparatus that may be used in the home. A variety of coffee roasting apparatus have been devised to meet this market. Examples of such a coffee roasting apparatus are illustrated in U.S. Pat. No. 5,564,331 issued Oct. 15, 1996 to Song, and in application Ser. No. 09/134,324, filed Aug. 14, 1998, titled "APPARATUS FOR ROASTING COFFEE BEANS", to Kelley, the entire disclosures of which are herein incorporated by reference. These roasters work well for their intended purpose, but there is always room for further improvement.

For example, to achieve optimum roasting, it is necessary that the beans be uniformly heated. If the heating is not uniform, some of the beans may pop early in the roasting process and others, not at all. Consequently, uniform flavor cannot be obtained. Thus, there is a continuing need to improve the uniformity of heating, and/or provide uniformity of heating in connection with other improvements.

Similarly, it is desirable for the roasting temperature to be accurately controlled to assure maximum husk removal, as well as proper flavor development, which cannot occur if the roasting temperature is either too low or too high. The roasting temperature can be affected in a number of ways. For example, coffee roasters intended for home use have generally subjected the coffee beans to an air stream that is heated by an electrical resistance heater, the heat generation of which can be significantly affected by variation in line voltage.

To control the electrical resistance heater, and/or accommodate the voltage fluctuations, at least one coffee roaster has energized and de-energized the electrical resistance heater by opening and closing a relay. However, this may reduce the life of the relay and may provide fluctuations in the roasting temperature that are less than optimum.

Another common concern for home use coffee makers is the consistency from one roasting cycle to the next roasting cycle, which may occur several days apart. Typically, coffee roasters are provided with a mechanical timer that must be turned to the desired roasting time each time the roaster is used. It can be difficult to return the mechanical timer to precisely the same setting from one operation to the next to achieve the desired roast. Further, because of the time period between operation of the coffee roaster, a user may forget which setting on the timer has provided the user with the user's desired roast.

Another common challenge for all coffee roasters is the relatively high temperatures required for roasting the coffee beans. These temperatures create a number of concerns, including the safety of the user and the type of materials that can be used in the roaster to accommodate the high temperatures and the costs associated with such materials.

A concern somewhat related to the high temperature of the roasters is the energy efficiency of such roasters, which can require relatively large amounts of power to provide the high temperatures.

Other concerns include the potential for contaminants to enter the hot air stream of the coffee roaster, cooling of the coffee roaster components, the convenience of using the coffee roaster, and the appearance and functionality of the coffee roaster components.

The present invention is directed to addressing one or more of the above concerns.

SUMMARY OF THE INVENTION

The principal object of the invention is to provide a new and improved coffee bean roasting apparatus, particularly suited for home use.

In one form of the invention, an apparatus for roasting coffee is provided and includes a housing having an air inlet and an air outlet spaced from the air inlet, a coffee bean roasting chamber mounted to the housing, an electric motor within the housing, a first fan in fluid communication with the roasting chamber and driven by the electric motor to create a roasting air flow from the air inlet to the roasting chamber, a heater within the housing to heat the roasting air flow prior to the roasting air flow entering the roasting chamber, and a second fan driven by the electric motor to create an evacuating air flow from the housing through the air outlet to remove motor generated contaminants from the housing.

In one form, the apparatus further includes a barrier surrounding the air outlet on an exterior surface of the housing to inhibit movement of motor generated contaminants from the air outlet to the air inlet after the motor generated contaminants are removed from the housing. The barrier defines an opening that directs the evacuating air flow away from the air inlet.

According to one aspect of the invention, a roasting chamber is provided for roasting coffee beans and includes a bottom having at least one air inlet opening to create a substantially vertical air stream into the roasting chamber, a diverter located above the bottom in a position that is centered in the vertical air stream to redirect coffee beans moving upwardly in the vertical air stream toward a location in the roasting chamber that is remote from the at least one air inlet opening, and at least one guide surface to guide the redirected coffee beans back toward the at least one air inlet opening.

In one form, the bottom is planar and the at least one guide surface includes a slant surface that slants downwardly to the planar bottom.

In one form, the at least one guide surface also includes a vertically extending outer wall, with the slant surface slanting downwardly from the outer wall to the bottom.

In one form, the at least one air inlet opening includes a first plurality of circular holes of a first diameter and a second plurality of circular holes of a second diameter larger than the first diameter, with the second plurality of circular holes nominally located at an intersection between the planar bottom and the slant surface.

According to one aspect of the invention, a roasting chamber is provided for roasting coffee beans and includes an outer wall in the shape of a body revolution about a vertical axis, a base including a planar bottom and an upwardly opening, frusto-conical side wall extending from the planar bottom to the outer wall, the bottom and the side wall nominally centered on the vertical axis, and a mushroom-shaped diverter extending upwardly from the planar bottom, nominally centered on the vertical axis. The base further includes at least one air inlet opening extending through at least one of the bottom and the side walls.

According to one aspect of the invention, an apparatus is provided for roasting coffee beans and includes a coffee bean roasting chamber, a handle for the roasting chamber, a band wrapped around the roasting chamber clamping the handle thereto. The band includes a plurality of ramped tabs extending away from the roasting chamber, and a cover for the roasting chamber. The cover includes a plurality of ramped lands, the lands engaging with the ramped tabs on the band to lock the cover to the roasting chamber when the cover is rotated relative to the roasting chamber in a first direction, and disengaging from the ramp tabs on the band to release the cover from the roasting chamber when the cover is rotated relative to the roasting chamber in a direction opposite the first direction. Thus, the band serves to mount the handle to the roasting chamber and to removably and releasably mount the cover to the roasting chamber.

According to one aspect of the invention, a method is provided for controlling the roasting temperature in the roasting chamber of a hot air coffee roaster including an electric heater and a fan that forces air past the heater to generate a hot air flow into the coffee roaster. The method includes the steps of energizing the electric heater, driving the fan at a normal operating speed, monitoring a temperature of the hot air flowing into the roasting chamber, and driving the fan at a cooling speed that is greater than the normal operating speed in response to the monitored temperature exceeding an upward temperature limit.

In one form, the method further includes the step of returning the fan to the normal operating speed from the cooling speed in response to the monitored temperature dropping below a lower temperature limit.

In one form, the step of powering the fan at a cooling speed includes powering the fan at the cooling speed for a fixed period of time in response to the monitored temperature remaining a lower temperature limit for the fixed period of time.

In one form, the method further includes the step of de-energizing the electric heater in response to the monitored temperature remaining above the upper temperature limit for the fixed period of time.

According to one aspect of the invention, an apparatus is provided for roasting coffee beans and includes a housing having an air inlet, a coffee bean roasting chamber mounted to the housing, an electric motor within the housing, a fan in fluid communication with the roasting chamber and driven by the motor to create a roasting air stream directed to the roasting chamber, an electric heater within the housing to heat the roasting air stream prior to the roasting air stream entering the roasting chamber, and a control for the motor. The control includes a temperature sensor located in the air stream downstream of the heater. The control is operative to power the motor at a cooling speed in response to the sensor detecting a temperature greater than an upper temperature limit and to power the motor at a normal operating speed in response to the sensor detecting a temperature less than a lower temperature limit. The normal operating speed is less than the cooling speed.

According to one aspect of the invention, an apparatus is provided for roasting coffee and includes a housing having an air inlet, a coffee bean roasting chamber mounted to the housing, an electric motor within the housing, a fan driven by the electric motor to create a roasting air stream directed to the roasting chamber, an electric heater within the housing to heat the roasting air stream prior to the roasting air stream entering the roasting chamber, a control for the heater and the fan that is operative to energize the heater and power the motor to drive the fan to provide a roasting cycle, and a switch operably connected to the control to de-energize the heater while running the motor for a predetermined time period in response to activation of the switch by a user during the roasting cycle.

In one form, the control is operative to energize the motor and the electric heater to obtain a desired roasting cycle based on a setting input by a user. The control also maintains the setting between roasting cycles absent further input by a user. The apparatus further includes a second switch operably connected to the control to initiate the desired roasting cycle in response to activation of the second switch by a user.

In one form, the control is operative to maintain a temperature range determined from the setting for a fixed period of time, with the fixed period of time being independent of the setting.

In one form, the control is operative to maintain a fixed temperature range for a period of time that is determined from the setting, with the fixed temperature range being independent of the setting.

According to one aspect of the invention, an apparatus is provided for roasting coffee and includes a coffee bean roasting chamber including an upper portion defined by a nominally cylindrical wall that terminates in a nominally circular lip that surrounds an open top of the roasting chamber, and a cover for the open top of the roasting chamber. The cover includes a preformed resilient seal having a nominally cylindrical portion that blends into a nominally planar portion that extends radially from the cylindrical portion. The cylindrical portion is adapted to form a seal with the cylindrical wall of the roasting chamber and the planar portion is adapted to form a seal with the circular lip of the roasting chamber when the cover is installed on the roasting chamber.

According to one aspect of the invention, a roasting chamber is provided for roasting coffee and includes a vessel, a metallic base, and a plastic mount ring. The vessel has an open bottom and is defined by an outer wall in the shape of a body of revolution about an axis. The outer wall includes a radially inwardly extending annular shoulder. The metallic base is mounted within the open bottom of the vessel and has an outer periphery abutting the shoulder. The base includes at least one inlet for the introduction of a hot air stream into the vessel. The plastic mount ring is fastened to the metallic base to clamp the shoulder of the vessel between the metallic base and the mount ring, thereby assembling the vessel, the metallic base and the mount ring into an integral unit.

According to one aspect of the invention, an apparatus is provided for roasting coffee beans and includes a housing, a motor within the housing, a fan, a heater within the housing, and a coffee bean roasting chamber. The housing includes an air inlet, a hot air outlet, a radially outwardly facing cylindrical surface surrounding the hot air outlet, and a plurality of circumferentially spaced tabs extending radially outwardly from the radially outwardly facing cylindrical surface. The fan is driven by the motor to create a roasting air stream which is directed to the hot air outlet. The heater heats the roasting air stream prior to the roasting air stream entering the hot air outlet. The coffee bean roasting chamber includes a cylindrical wall that surrounds the radially outwardly facing cylindrical surface of the housing with the chamber installed on the housing. The roasting chamber further includes a plurality of circumferentially spaced tabs extending radially inwardly from the cylindrical wall. The tabs on the chamber engage with the tabs on the housing to lock the chamber to the housing when the chamber is rotated relative to the housing in a first direction. The tabs on the chamber disengage from the tabs on the housing to release the chamber from the housing when the chamber is rotated relative to the housing in a direction opposite of the first direction.

According to one aspect of the invention, a hull collector is provided for a hot air coffee roasting apparatus to collect hulls and other chaff produced by the roasting of coffee beans in the coffee roasting apparatus. The hull collector includes a body defining a collection area for hulls and other chaff produced by the roasting of coffee beans, a hot air inlet to the body for the hot air stream used in roasting the coffee beans, a hot air outlet from the body for the hot air stream used in the roasting of coffee beans, a first filter positioned in the body between the hot air outlet and the hot air inlet and having openings of a first size to filter a first size of hulls and other chaff from the hot air stream as the hot air stream flows from the hot air inlet to the hot air outlet, and a second filter positioned between the first filter and the hot air outlet and having openings of a second size smaller than the first size to filter a second size smaller than the first size of hulls and other chaff from the hot air stream as the hot air stream flows from the first filter to the hot air outlet. Thus, the first filter inhibits large hulls and other chaff from clogging the second filter, and the second filter inhibits smaller hulls and other chaff from exiting the hot air outlet.

Other objects and advantages will be apparent from the following specification taken in connection with the accompanying drawings.

DETAILED DESCRIPTION OF THE PREFERRED EMBODIMENT

Figure 1:
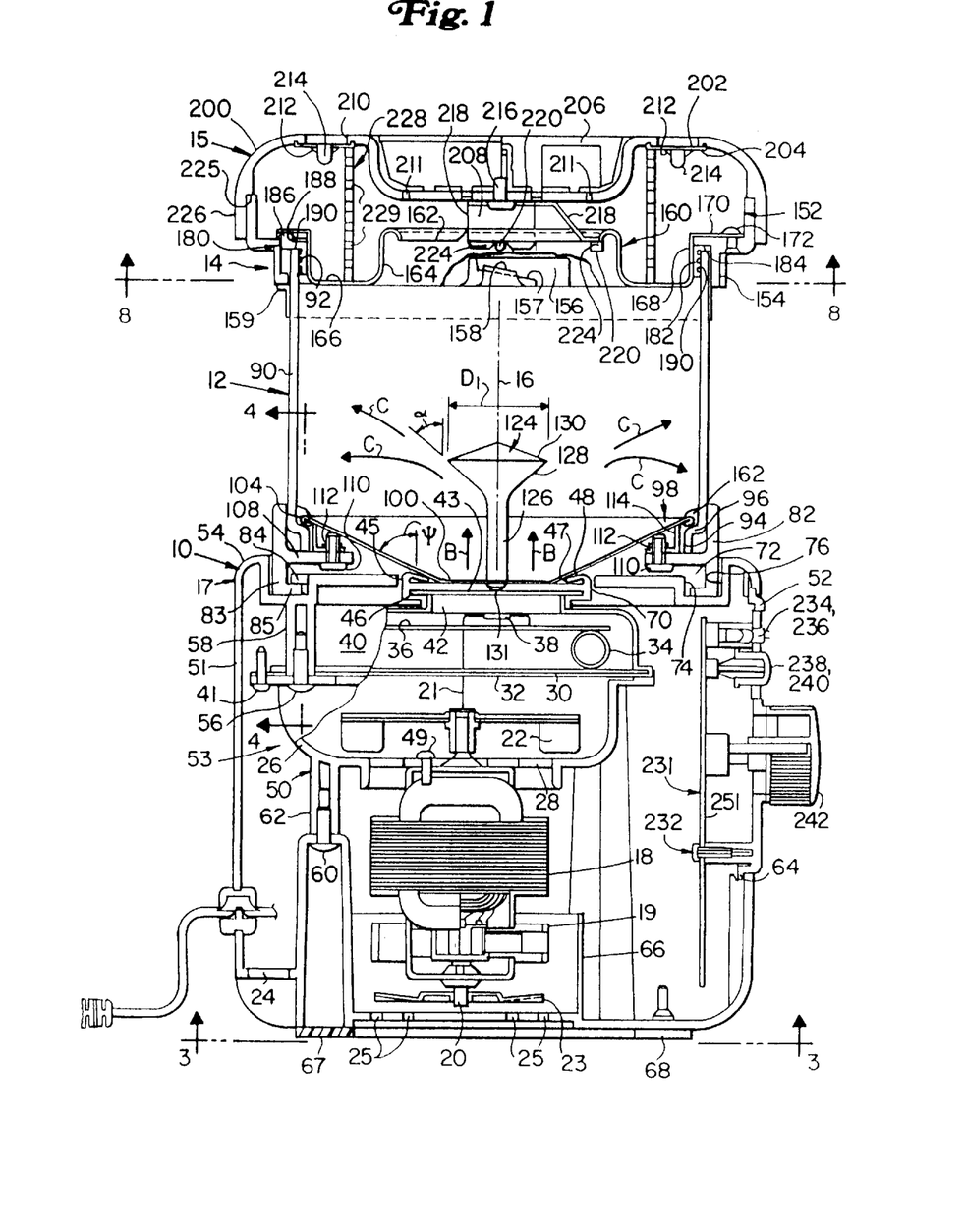
FIG. 1 is a sectional view of a coffee roaster embodying the invention.

An exemplary embodiment of a coffee bean roasting apparatus made according to the invention is illustrated in FIG. 1 and is seen to include four major components, including a power base 10, removably supporting a coffee roasting chamber, generally designated 12. A chaff/hull receiver or collector, generally designated 14, is located at the upper end of the coffee roasting chamber 12, . The hull receiver 14, in turn, removably receives a lid, generally designated 15. The power base 10, the roasting chamber 12, the hull collector 14 and the lid 15 are all generally centered on a vertical, central axis 16 of the coffee bean roasting apparatus.

The power base 10 includes a main housing in the form of an assembly 17, a commutated electrical motor 18 having carbon brushes 19 and an output shaft 20 that rotates about a vertical motor axis 21 and mounts first and second fans or impellers 22 and 23 for rotation about a motor axis 21. The housing assembly 17 includes air inlet openings 24 and air outlet openings 25 in its underside. The fan 22 is located in a cup-shaped housing 26 having intake openings 28 through which air may flow from the inlet openings 24 in the main housing 17 to the fan 22.

Just above the fan 22, a mica sheet 30 with one or more air flow apertures 32 mounts a heater 34 in the form of a circular, electrical resistance heating element. The heating element 34 is, in turn, held in position on the mica sheet 30 by an additional mica sheet 36. A temperature sensor 38, preferably in the form of a thermistor, is mounted on the mica sheet 36 on the side thereof opposite the resistance element 34 centered on the axis 16 and thus, in the path of air flow, is downstream of the heating element 34 and upstream of the roasting chamber 12.

Figure 2:
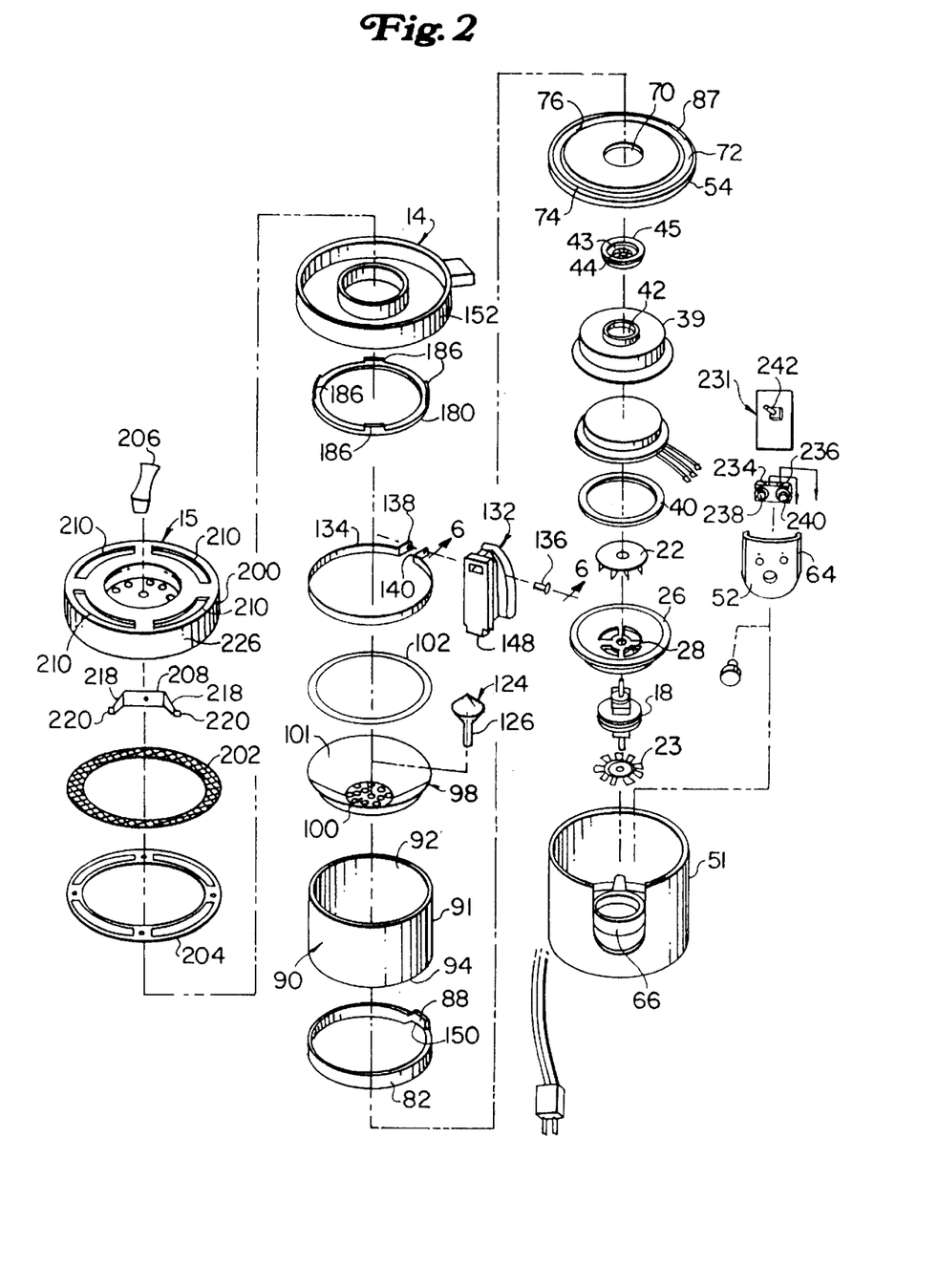
FIG. 2 is a diagrammatic, exploded view of the coffee roaster.

The heating element 34, the sensor 38, and the fan 22 are enclosed in an assembly including the cup-shaped housing 26 along with a second, inverted cup-shaped housing 39 which is secured to the mica sheet 30 and to the cup shaped element 26 by any suitable means, such as a plurality of circumferentially spaced threaded fasteners 41 (only one shown in FIG. 1), that clamp a ring-shaped seal 40 between the mica sheet 30 and the housing 26. The cup-shaped housing 39 includes a hot air outlet opening 42 through which air heated by the element 34 may be discharged upwardly. The outlet opening 42 is centered on the central axis 16. A circular plate 43 having a plurality of circumferentially spaced pie-shaped apertures 44, best seen in FIG. 2, is fixed by deformable tabs to the housing 39 over the outlet opening 42. As best seen in FIG. 1, a generally ring-shaped, high temperature sealing element 45 is centered on the axis 16 and mounted to the housing 39 by an outermost rim of the plate 43 that engages an annular slot 46 in the sealing element 45. The sealing element 45 includes a radially inwardly directed sealing flange 47 that includes a pair of upwardly directed annular ribs 48. The flange 47 and ribs 48 engage a lowermost portion of the roasting chamber 12 to prevent leakage of heated air as it moves from the resistance element 34 upwardly into the roasting chamber 12. Preferably, the sealing element is made from a suitable silicon material. The motor is fixed to the cup-shaped housing 26 by any suitable means, such as a plurality of fasteners 49 (only one shown in FIG. 1). Together, the housings 26 and 39, the mica sheet 30, the seal 40, the resistance element 34, the sensor 38, the fan 22, the circular plate 43, the ceiling element 45 and the motor 18 define a heater/motor subassembly 50 that is centered on the motor axis 21.

The main housing 17 includes a generally cylindrically shaped, substantially hollow base housing 51 centered on the axis 16, a control mounting panel 52, and a vessel mounting cover 54. The heater/motor subassembly 50, is attached to the housing assembly 17 by any suitable means, such as by three circumferentially spaced threaded fasteners 56 (only one shown in FIG. 1), each of which engages a post 58 formed integrally with the cover 54. Similarly, the cover 54 and the heater/motor subassembly 50 are attached to the base housing 51 by any suitable means, such as by three threaded fasteners 60 that engage respective support post 62 (only one shown in FIG. 1) formed integrally either on the cup-shaped housing 26 or on the cover 54. The panel 52 includes a lip 64 which extends around the periphery of the panel 52 and engages with mating structures on the base housing 51 and the cover 54 to retain the panel 52 to the main housing assembly 17.

Figure 3:
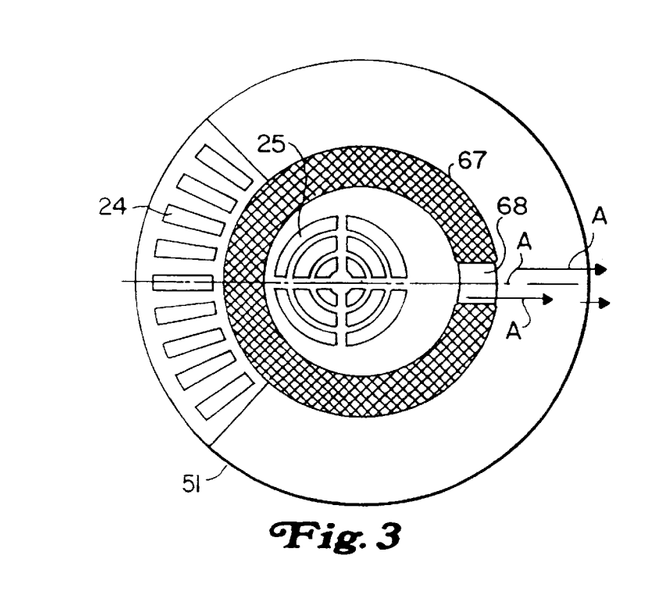
FIG. 3 is a bottom view taken along line 3—3 in FIG. 1.

The base housing 51 includes a cylindrical wall portion 66 centered on the motor axis 21 and extending around the impeller 23 and the commutator 19 of the motor 18. As best seen in FIG. 3, a generally C-shaped barrier in the form of resilient foot member 67 is mounted to the bottom of the base housing 50 surrounding the air outlet openings 25 and defines an opening 68 that is directed away from the air inlet openings 24. In operation, the fan 23 creates an air flow from the interior of the housing assembly 17 through the outlet openings 25. The air flow is directed past the commutator 19 by the wall 66 so that the air flow forces motor generated contaminants, such as carbon particles generated by the brushes 19 engaging the motor commutator through the openings 25. The foot member 67 directs the air flow, and the contaminants therein, out through the opening 68 in a direction away from the air inlets 24, as shown by the arrows A to prevent the contaminants from being drawn back into the interior of the housing assembly 17 through the air inlets 24. The resiliency of the member 67 creates a sufficient seal with the counter top on which the roaster is placed to close any significant leakage path for the carbon particles toward the air inlets 24.

Figure 4:
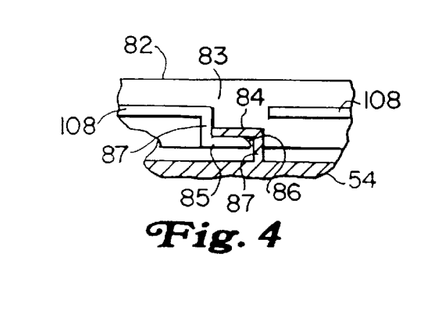
FIG. 4 is an enlarged, fragmentary sectional view of selected components taken substantially along line 4—4 in FIG. 1.

The cover 54 includes a hot gas outlet opening 70 surrounding the opening 42 and the seal 45 of the heater/motor subassembly 50. An annular, vessel mounting groove 72 is centered on the axis 16 surrounding the opening 70 and is defined by a radially outwardly facing cylindrical surface 74 that is spaced radially from a radially inwardly facing cylindrical surface 76. The groove 72 receives a mount ring 82 having a cylindrical wall 83 and that is centered on the axis 16 and fixed to the roasting chamber 12. Four equally circumferentially spaced, radially outwardly extending tabs 84 (only one shown in FIG. 1) on the housing 54 engage a like number of equally circumferentially spaced, radially inwardly extending tabs 85 (only one shown in FIG. 1) on the ring 82 extending radially inwardly from the wall 83. The tabs 84 and 85 are engaged by placing the mount ring 82 into the groove 72 and then rotating the roasting chamber 12 and the mount ring 82 about the axis 16 relative to the main housing assembly 17 and the groove 72 to lock the roasting chamber 12 to the main housing 17. By reversing the direction of rotation about the axis 16, the tabs 84 and 85 can be moved out of engagement and the vessel 12 can be lifted from the housing assembly 17. Preferably, at least one set of the tabs 84 and 85 have angled chamfers 86 on their leading edges to cause engagement with the other set of tabs 84 and 85, as best seen in FIG. 4. It is also preferred that at least one set of the tabs 84 and 85 have support/stop walls 87 extending perpendicular from their trailing edges to provide structural support for the tabs 84 and 85 and to limit the relative rotation between the roasting chamber 12 and the main housing assembly 17. Further, it is preferred that the radially inwardly facing cylindrical surface 76 include a circumferentially extending relief 88 that receives a circumferentially extending protrusion 89 on the mount ring 82 to angularly orient the tabs 84 and 85 relative to each other when the mount ring 82 is inserted into the groove 72. It should be understood that the relief 88 should have a sufficient circumferential length to allow movement of the protrusion 89 within the relief 88 when the roasting chamber 12 and the main housing assembly 17 are rotated relative to each other to engage and disengage the tabs 84 and 85.

The roasting chamber 12 includes a vessel 90 defined by an outer wall 91 in the shape of a body of revolution, preferably a cylinder, centered on the axis 16 and is preferably made of heat and shatter resistant glass. The vessel 90 includes an upper outlet, generally designated 92 in FIG. 2, and an open bottom, generally designated 94 in FIG. 2, with an inwardly extending annular shoulder 96. The open bottom 94 is closed by a lower wall or base 98 that includes a planar bottom 100 that blends into an upwardly opening, frusto-conical side wall 101 extending from the bottom 100 to the outer wall 91 of the vessel 90. Preferably, the base 98 is formed from a suitable metal, such as 304 stainless steel. A resilient, ring-shaped seal 102 is seated between the shoulder 96 of the vessel 90 and an outermost periphery 104 of the lower wall 98. Preferably, the seal 96 is made from a suitable high temperature resilient material, such as a suitable silicone material. While the mount ring 82, the vessel 90, and the lower wall 98 may be fixed together by any suitable means, in the preferred embodiment, the shoulder 96 of the vessel 90 is clamped between the outer periphery 104 of the base 98 and a radially inwardly extending flange 108 on the mount ring 82 by three circumferentially spaced, threaded fasteners 110 (only two shown in. FIG. 1) that extend through holes in the flange 108 to engage threaded bosses 112 in a ring-shaped flange 114 that is integral with the base 98.

Figure 5:
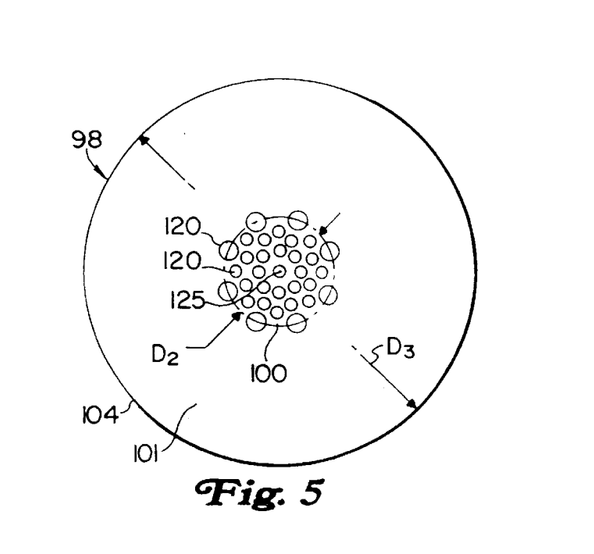
FIG. 5 is a plan view of a base for a roasting chamber of the coffee roaster.

As best seen in FIG. 5, the lower wall 98 includes a plurality of inlet openings 120 formed mostly in the bottom 100 to direct a hot air stream vertically into the chamber 12 from the outlet 43, as indicated by the arrows B in FIG. 1. While the holes 120 may be arranged in a number of ways and may be of any suitable number size and shape, in the preferred embodiment, the holes 120 are circular, and are arranged so that the radially innermost holes 120 are smaller than the radially outermost holes 120, with all the holes 120 being distributed relatively uniformly about the central axis of the vessel 90 and the outermost holes centered at the intersection between the bottom 100 and the wall 101. This particular arrangement provides a relatively high velocity hot air stream at the centermost portion of the base 98 surrounded by a somewhat lower velocity hot air stream from the outermost holes 120. This arrangement has proven advantageous in assuring that the coffee beans circulate relatively uniformly during the roasting process without stagnating at any point on the base 98.

The roasting chamber 12 further includes a diverter 124 located above the bottom 100 in a position that is centered in the vertical hot air stream from the holes 120 to redirect coffee beans moving upwardly in the vertical airstream toward a location in the roasting chamber 12 that is remote from the inlet openings 120, as shown by the arrows C in FIG. 1. The outer wall 91 and the frusto-conical wall 101 act as guide surfaces that guide coffee beans back toward the inlet openings 120 after they have been redirected by the diverter 124. Thus, it can be seen that the interaction of the hot air stream generated by the inlet openings 120, the diverter, the outer wall 91 and the frusto-conical wall 101 creates a recirculating movement of the coffee beans as they are roasted wherein the coffee beans are continuously circulated from the hot air stream to a location remote from the hot air stream and then back into the hot air stream to ensure a uniform roast of all the coffee beans. In this regard, in the preferred embodiment, the diverter 124 is a generally mushroom-shaped diverter 124 that extends upwardly from the bottom 100 and is centered on the axis 16. The diverter 124 includes a cylindrical stem 126 that blends into a cone-shaped head 128 that is topped by another conical shaped head portion 130. The diverter 124 is attached to the base 98 by a suitable fastener, such as threaded fastener 131. The angle $\alpha$ of the cone-shaped head 128, the diameter D1 of the cone-shaped head 128, the diameter D2 of the planar bottom 100, the diameter D3 of the periphery 104, and the angle $\Psi$ of the frusto-conical wall 101 are all important factors in achieving the desired recirculation of the coffee beans within the roasting chamber 12. For example, the angle $\alpha$ and the diameter D1 of the diverter 124 are important in assuring that the coffee beans are directed against the outer wall 91 of the vessel 90, rather than being directed upwards to exit the opening 92 of the vessel 90. By way of further example, the angle $\Psi$ of the frusto-conical wall 101 is important to assure that the coffee beans return back to the inlet openings 120 after being redirected by the diverter 124, but not so quickly that the coffee beans accumulate over the holes 120. While any number of combinations are possible to achieve the desired results, in the preferred embodiment illustrated in the figures, $\alpha$ is approximately equal to 39°, $\Psi$ is nominally equal to 65°, D1 is nominally equal to 30 mm, D2 is nominally equal to 32 mm, and the diameter D3 is nominally equal to 115 mm.

In addition to providing a recirculation of the coffee beans that achieves a uniform roast of all the coffee beans, the diverter 124 increases the dwell time of the hot air stream within the roasting chamber 12 by redirecting the hot air stream so that it does not flow directly out of the roasting chamber 12. This increases the operating efficiency of the coffee roaster.

Figure 6:
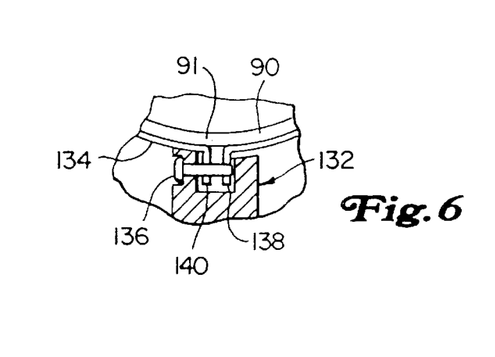
FIG. 6 is an enlarged, fragmentary sectional view taken along line 6—6 in FIG. 2 showing the connection of a handle to the roasting chamber of the coffee roaster.

As best seen in FIG. 2, a handle 132 is fixed to the roasting chamber 12 by a band 134 that is tightened around the outer surface of the vessel 90 by a threaded fastener 136 that extends through the handle 132 to engage the band. More specifically, as best seen in FIG. 6, the band includes a pair of flanged ends 138 and 140 that extend into a slot 142 in the handle 132. The threaded fastener 136 extends through an opening in the handle 132 and engages with threads on the flanged end 138 to pull the flanged ends 138 and 140 toward each other, thereby tightening the band to the outer surface of the vessel 90 and engaging the handle 132 to the band 134 to mount the handle 132 to the roasting chamber 12. As best seen in FIG. 2, a tab 148 on the handle 132 extends into a receiving slot 150 formed on the mount ring 82 to retain the lower portion of the handle 132 to the roasting chamber 12. In addition to mounting the handle 132 to the roasting chamber 12, the band 134 serves to removably and releasably mount the hull collector 14 to the roasting chamber 12. More specifically, as best seen in FIG. 1, the hull collector 14 includes a generally ring-shaped mounting member 152 having a downwardly extending cylindrical flange 154. The flange 154 includes four equally circumferentially spaced notches 156, each of which has a ramped land 157. The notches 156 receive a like number of equally circumferentially spaced ramped tabs 158 that extend radially outwardly from the band 134 and that are engageable with the ramped lands 157. When the hull collector 14 is rotated relative to the roasting chamber 12 in one direction, the hull collector 14 is locked by the engagement of the lands 157 and tabs 158 to the roasting chamber 12. The opposite rotation releases the hull collector 14 from the roasting chamber 12. In this regard, it should be understood that the band 134 could be used to removably and releasably mount any type of cover for the roasting chamber 12, regardless of whether the cover also serves the function as a hull collector 14.

Figure 8:
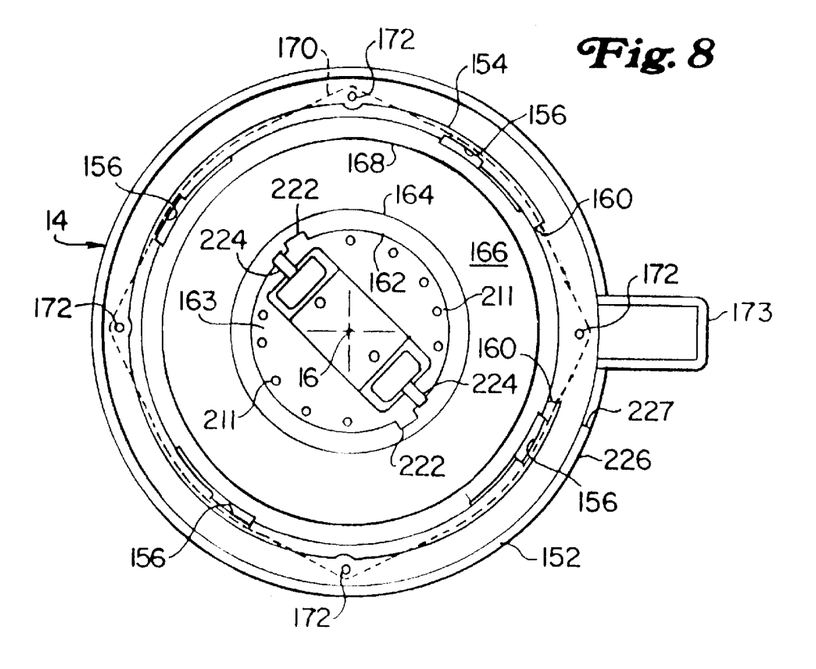
FIG. 8 is a sectional view taken substantially along line 8—8 in FIG. 1 showing the hull collecting component and a lid therefor.

In the preferred embodiment, the band 134 also includes four equally circumferentially spaced non-ramped tabs 159 that extend radially outwardly from the band 134 to engage the bottom lip of the wall 154 to limit the downward engagement of the hull collector 14 to the vessel 90 resulting from the interaction of the ramped lands and tabs 157 and 158. While the band 134 may be formed of any suitable material, it is preferred that the band 134 be formed of a suitable stainless steel with the tabs 158 and 159 being unitary members of the band 134. Further, as best seen in FIG. 8, the flange 154 includes a circumferentially extending notch 160 that receives an upper portion of the handle 132 and has sufficient circumferential clearance to allow the relative rotation between the hull receiver 14 and the roasting chamber 12 to allow the lands 157 and tabs 158 to engage and disengage.

Figure 7:
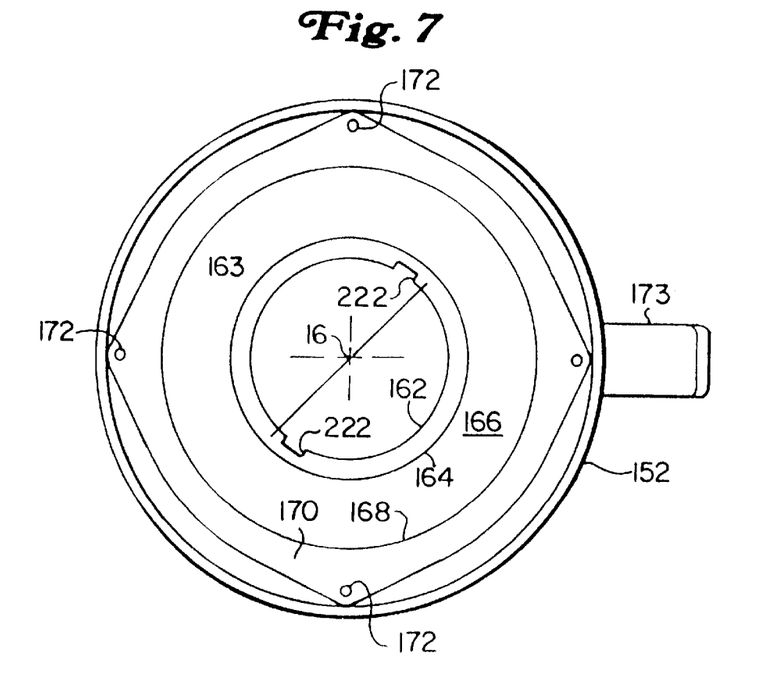
FIG. 7 is a top plan view of a hull collector component of the coffee roaster shown in FIG. 1.

As best seen in FIG. 1, the hull collector 14 also includes a bottom wall 160 connected to the mounting member 152. The wall 160 includes an innermost flange 162 centered on the axis 16 and defining a central hot air inlet opening 163. The flange 162 is connected to a cylindrical wall portion 164 that is centered on the axis 16 and blends into a planar bottom 166, which in turn blends into another cylindrical wall portion 168 of the bottom wall 160. As best seen in FIG. 7, a generally planar, outermost flange 170 of the bottom wall 160 extends from the cylindrical portion 168 and is fixed to the mounting member 152 by any suitable means, which in the preferred embodiment is provided in the form of a plurality of circumferentially spaced rivets 172 (only one shown in FIG. 1). As seen in FIGS. 7 and 8, the mounting member 152 further includes a handle 173 that extends radially outwardly from the mounting member 152 and is formed as a unitary part thereof.

As best seen in FIG. 1, the hull collector further includes a preformed, resilient seal 180 having a cylindrical portion 182 that blends into a planar, ring-shaped flange portion 184 extending radially outward from the cylindrical portion 182, with both the cylindrical portion 182 and the flange 184 centered on the axis 16. Four circumferentially spaced deformable tabs 186 extend upwardly through mating slots 188 in the mounting member 152 to engage the seal 180 with the mounting member 152. The cylindrical portion 182 has an interference fit with the cylindrical wall 168 of the bottom wall 160 and includes three ring-shaped ribs 190 that engage the inner surface of the outer wall 91 of the vessel 90 to restrict the escape of heated air from the roasting chamber 12. The planar portion 184 engages a circular lip 190 of the vessel 90.

It should be appreciated that the seal 180 increases the efficiency of the coffee roasting apparatus by inhibiting the leakage of hot air from the coffee roasting apparatus.

Preferably, the bottom wall 160 is made from a stamped piece of suitable metal, such as 430 stainless steel. This tends to reflect heat back towards the roasting chamber 12 and serves to protect the mounting member 152 and the lid 15 from overheating. Preferably, the mounting member 152 is formed from a suitable high temperature plastic material, such as a phenolic plastic. It is preferable that the seal 180 be formed from a suitable high temperature resilient material, such as a suitable resilient silicon material.

The lid 15 includes a generally inverted cup shaped housing 200, a planar, ring-shaped filter screen 202, a planar, generally ring-shaped filter screen mount bracket 204, a handle 206, and a locking bracket 208. The filter screen 202 is mounted against an upper surface of the housing 200 by the bracket 204 and covers a hot air outlet in the form of four circumferentially extending and spaced slots 210 to prevent hulls from exiting through the slots 210 with the hot air stream. Optionally, the lid 15 may include a plurality of relatively small sized hot air outlets 211 immediately opposite the hot air inlet 163. The outlets 211 should be of a sufficiently small size to prevent a significant amount of chaff from exiting through the outlets 211. Preferably, the outlets 211 are circular with a nominally 2mm diameter. The outlets 211 act as a safety feature to prevent overheating of the coffee roasting apparatus by providing an outlet for the hot air stream in the event that the filter screen 202 should become so blocked with chaff that the hot air stream would otherwise begin to stagnate and thereby overheat the coffee roaster.

The bracket 204 is retained to the housing 200 by four sets of resilient finger flanges 212, each set engaging a cylindrical stub tab 214 that extends downwardly from the cover 200. The locking bracket 208 and the handle 206 are fixed to the housing 200 by a threaded fastener 216 that extends through a hole in the bracket 208 to engage a threaded opening in the handle 206, thereby clamping the handle 206 and the bracket 208 to the housing 200. The locking bracket 208 includes a pair of downwardly extending legs 218 (one shown rotated out of plane in FIG. 1) each of which terminates in a cylindrically shaped foot 220 that extends in a radially outward direction. As best seen in FIG. 8, the feet 220 are received through respective slots 222 in the innermost flange 162 of the bottom wall 160 so that the feet 220 can engage a bottom lip 224 of the flange 162 when the lid 15 is rotated relative to the collector 14 to lock the lid 15 and the collector 14 together. The housing 200 includes an annular shoulder 225 and a downwardly extending cylindrical lip 226 that overlay the mounting member 152 to prevent the leakage of hot air from the hull collector 14. A circumferentially extending notch 227 is provided in the lip 226 to provide clearance for the handle 174 of the hull collector 14, with the circumferential length of the notch 227 being sufficient to allow the required relative rotation between the lid 15 and the hull collector 14 to engage and disengage the feet 220 with the lip 224.

Optionally, a cylindrical filter 228 can be placed within the hull collector 14 and the lid 15. The filter 228 includes an array of openings 227 of a size that is greater than the size of the openings in the filter screen 202. This allows the filter 228 to filter relatively large size hulls and other chaff from the hot air stream as the hot air stream flows from the hot air inlet 163 to the hot air outlet 210, thereby preventing such larger size hulls and other chaff from clogging the filter screen 202. The filter screen 202 filters relatively smaller size hulls and other chaff from the hot air stream that are not removed by the filter 227.

As best seen in FIGS. 1 and 2, a control 230 is provided in the form of the temperature sensor 38 and an electronic circuit assembly 231 mounted to the control mounting panel 52 by a plurality of threaded fasteners 232 (only one shown in FIG. 1). In this regard, it should be noted that in the preferred embodiment the axis 21 of the heater/motor assembly 50 is offset from the axis 16 of the coffee roasting apparatus to provide adequate clearance for the electronic circuit assembly 231. In some embodiments of the coffee roasting apparatus, this offset of the axes 21 and 16 will not be required.

Figure 9:
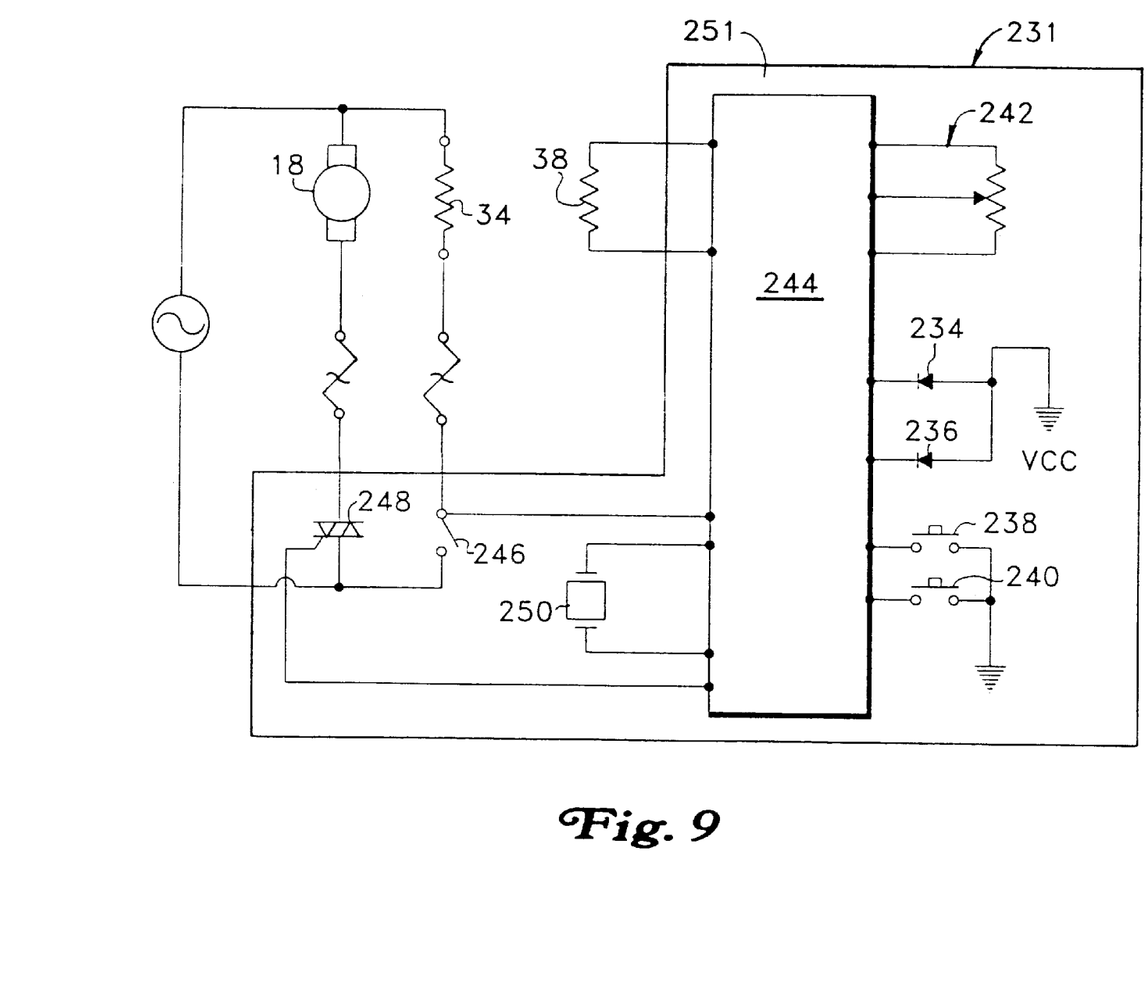
FIG. 9 is a schematic of the operating components and control employed in the coffee roaster.

As best seen in FIG. 9, the electronic assembly 231 includes a pair of LEDs 234 and 236 (only one shown in FIG. 1), a pair of switches 238 and 240 (only one shown in FIG. 1), a rheostat 242, a programmable control or chip 244, a relay 246, a TRIAC 248, and a resonator 249, all mounted on a printed circuit board 251 that electrically interconnects each of the aforementioned components. In the preferred embodiment, the programmable control 244 is provided in the form of a MICOM KS86C4104 programmable control. The motor 18 and the heater 34 are powered by normal household AC current (120 volt, 60 hertz) with the electronic circuit assembly being provided suitable DC power in a known fashion by a bridge rectifier and regulator (not shown). The relay 246 is opened and closed in response to control signals from the programmable control 244 in a known fashion to respectively de-energize and energize the resistance heater 34. The TRIAC 248 drives the motor 18 in a known fashion at either a normal operating speed (nominally 12,000 rpm in the preferred embodiment) or a cooling speed (nominally 15,000 rpm in the preferred embodiment) that is greater than the normal operating speed based on control signals from the programmable control 244. The normal operating speed creates an air stream from the fan 22 to the roasting chamber 12 having a first velocity, and the cooling speed creates an air stream from the fan 22 to the roasting chamber 12 having a second velocity that is greater than the first velocity. The resonator 249 provides a timing finction to the control 230, as is known.

The rheostat 242 allows a user to input a setting to the control 230 that determines the desired roasting cycle and that is maintained by the control 230 between roasting cycles absent further manipulation of the rheostat 242 by the user. In this regard, the control 230 can be provided in two different configurations. In the first configuration, a desired roasting temperature $T_D$ is preset in the coffee roaster, and the user inputs a desired roasting time period $t_p$ via the setting of the rheostat 242. Conversely, in the second configuration, the desired roasting time period $t_p$ is preset in the coffee roaster, and the user inputs the desired roasting temperature $T_D$ via the setting of the rheostat 242.

Figure 10:
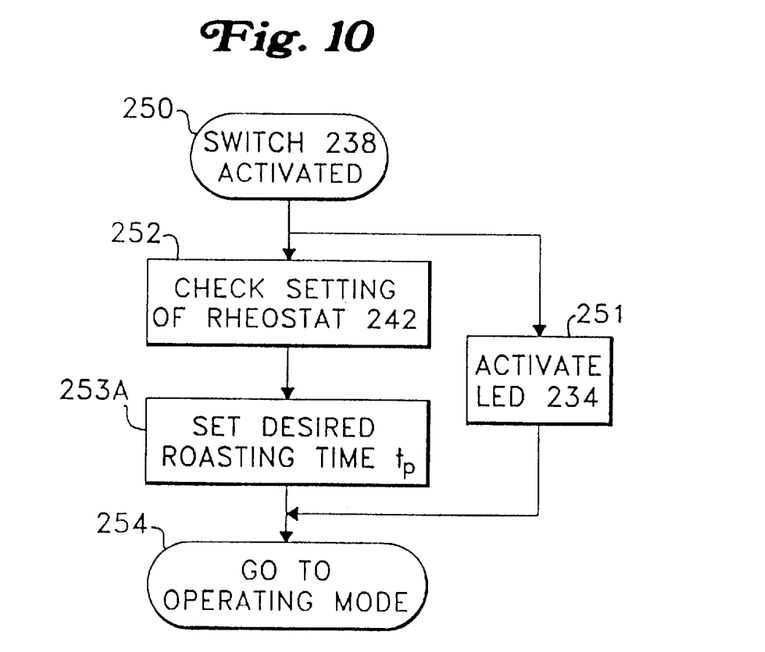
FIG. 10 is a logic diagram illustrating the control logic for obtaining a desired roast in one configuration of the coffee roaster.

More specifically, in the first configuration, as shown in FIG. 10, a user activates the roasting switch 238 to initiate a roasting cycle, as shown at block 250. In response to activation of the switch 238, the programmable control 244 is configured to activate the LED 234 and to detect the setting, as shown at 251 and 252. As shown at 253A, the detected setting is then used by the programmable control 244 to determine and set a desired roasting time period $t_p$ for the roasting cycle, with the desired roasting temperature $T_D$ being preset in the control 230 and thus independent of the setting of the rheostat 242. With respect to this configuration, in the preferred embodiment the preset desired roasting temperature $T_D$ is equal to 260° C. As shown at block 254, after the desired roasting time period to has been determined and set, the controller 230 initiates an operating mode that is shown in FIG. 12 and discussed in more detail below.

Figure 11:
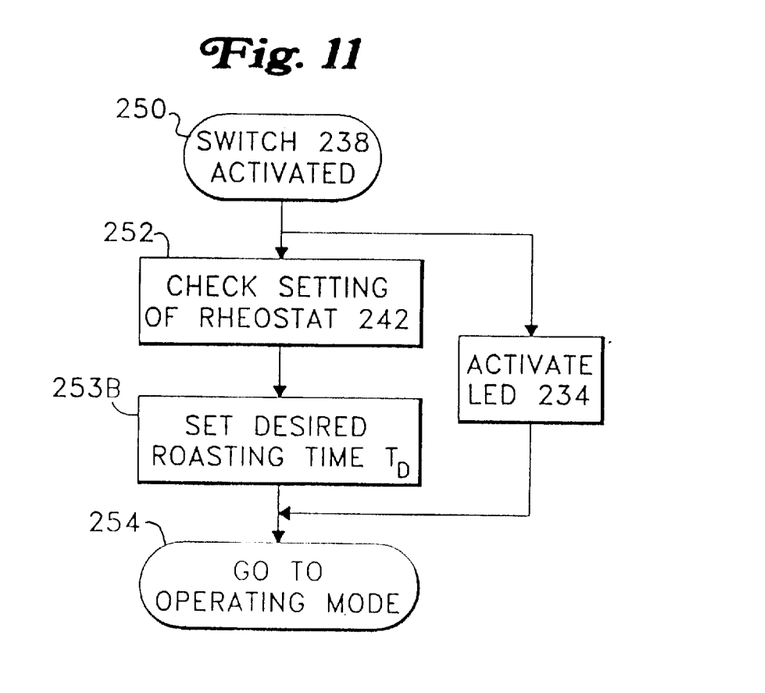
FIG. 11 is a logic diagram illustrating the control logic for obtaining a desired roasting cycle in another configuration of the coffee roaster.

In the second configuration, as seen in FIG. 11, after a user has initiated a roasting cycle by activating the roasting switch 238 at block 250, the programmable control 244 activates the LED 234 and detects the setting of the rheostat 242, as shown at 251 and 252. As shown at block 253B, the detected setting is then used by the programmable control 244 to determine the desired roasting temperature $T_D$, with the desired roasting time period $t_p$ for the roasting cycle being preset in the control 230 and thus independent of the setting of the rheostat 242. With respect to this configuration, the preset time period for the roasting cycle is preferably 15 minutes. As shown at block 254, after the desired roasting temperature $T_D$ is determined, the control 230 initiates the operating mode shown in FIG. 12, which is the same for both of the above-discussed configurations of the coffee roasting apparatus.

It should be appreciated that the use of the rheostat 242 increases the consistency from one roasting cycle to the next because it does not require a user to remember and/or accurately position a mechanical timer as in conventional coffee roasters. It should also be understood that the activation and deactivation of the LEDs 234 and 236 allow a user to visually determine the operating status of the coffee roaster.

Figure 12A:
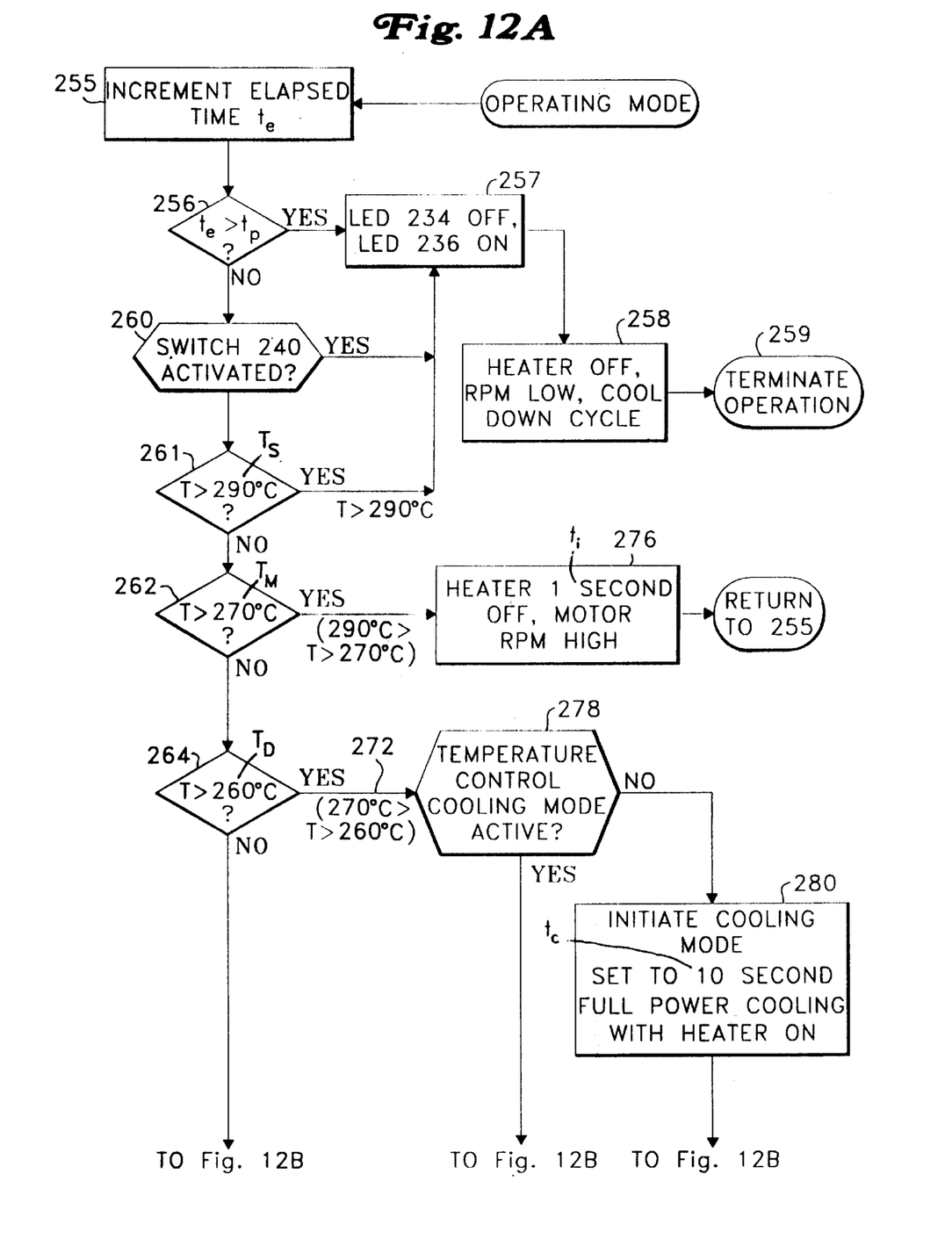
FIGS. 12A and 12B are a logic diagram illustrating the roasting temperature control logic for the coffee roaster.
Figure 12B:
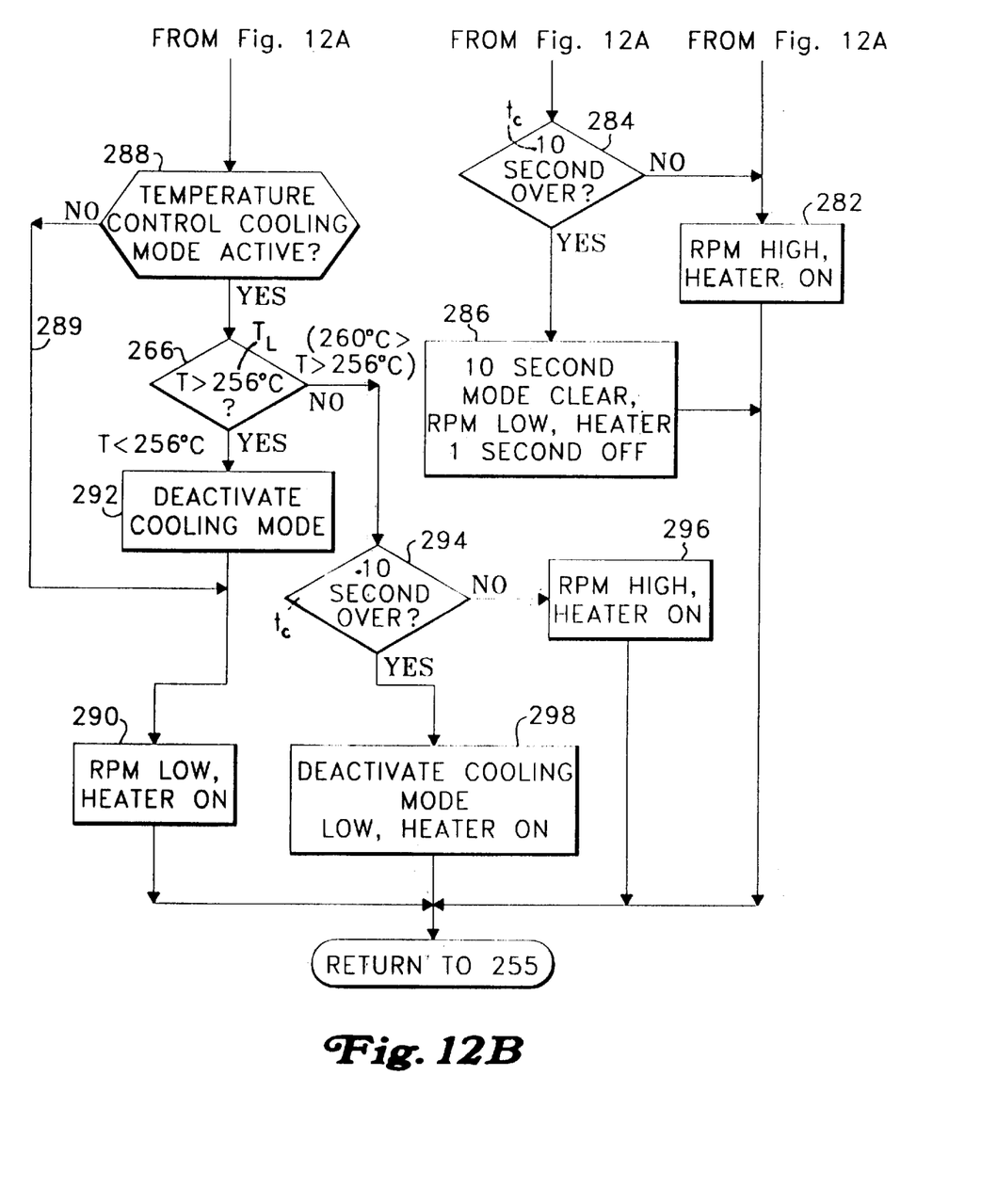

As seen by the logic diagram in FIG. 12, after entering the operating mode, the programmable control 244 is configured to monitor the operating status of the coffee roasting apparatus for every time increment $t_i$. Upon entering the operating mode, the programmable control 244 adds one time increment $t_i$ to an elapsed time $t_e$ for the roasting cycle, as shown at the block 255. The programmable control 244 then determines whether the elapsed time $t_e$ is greater than the desired roasting time period $t_p$, as shown at 256. If the elapsed $t_e$ does exceed the desired roasting time period $t_p$, the control 230 initiates a cool down cycle wherein the LED 234 is deactivated and the LED 236 is activated, as shown at the block 257, and the heater 34 is de-energized by opening the relay 246 and the motor 18 is driven at the cooling speed for a predetermined cool down time period (5 minutes in the preferred embodiment), as shown at the block 258. After the cool down time period has elapsed, operation of the coffee roasting apparatus is terminated, as shown at the block 259. A roasting cycle cannot be reinitiated by a user until after the cool down time period has expired.

If the elapsed roasting time $t_e$ does not exceed the desired roasting time period $t_p$, the control 230 is configured to determine whether the switch 240 has been activated by a user during the roasting cycle. If the switch 240 has been activated, the control 230 initiates the cool down cycle, as previously described and as shown at blocks 257, 258 and 259. It should be appreciated that this feature allows a user to terminate a roasting cycle whenever the user desires, such as when the coffee beans appear to the user to have achieved their desired roast, or when, for any other reason, the user wishes to discontinue operation of the coffee roaster.

As shown in the remainder of FIG. 12, for the active control of the roasting temperature T, the control 230 is configured to provide a "fan based" control of the roasting temperature T to maintain the desired roasting temperature $T_D$. Specifically, the control 230 is configured to obtain the desired roasting temperature $T_D$ by cycling the motor 18 between the normal operating speed and the cooling speed, while minimizing cycling of the relay 246 to energize and de-energize the electric heater 34. More specifically, the control is configured to initiate a temperature control cooling mode wherein the heater 34 is energized and the motor 18 is driven at the cooling speed for a fixed cooling time period $t_c$ (10 seconds in the illustrated embodiment) to reduce the roasting temperature T when it exceeds the desired roasting temperature $T_D$.

In this regard, the control 230 is configured to monitor the roasting temperature T based on the signal from the thermistor 38 and to initiate certain operating modes for the heater 34 and the motor 18 based upon whether the roasting temperature T is greater than or less than a number of reference temperatures $T_S$, $T_M$, $T_D$, and $T_L$ as shown at blocks 261, 262, 264, and 266. The control monitors the roasting temperature T at every time increment $t_i$ which in the preferred embodiment is equal to one second.

The control first checks to see if the roasting temperature T exceeds a safety temperature $T_S$ (290° C. in the illustrated embodiment), as shown at block 261. If the roasting temperature T is greater than the safety temperature $T_S$, the control 230 initiates the previously described cool down cycle, as shown at blocks 257, 258 and 259. This increases the safety of the operation of the coffee roasting apparatus by terminating the heating of the coffee roasting apparatus and preventing a reinitialization of the heating until after the cool down time period has expired.

If the roasting temperature is less than the safety temperature $T_S$, the control next determines whether the roasting temperature T is greater than a max roasting temperature $T_M$ (270° C. in the preferred embodiment), as shown at 262. If the roasting temperature T is greater than $T_M$, the heater 34 is de-energized by opening the relay 246 for one time increment $t_1$ (one second in the illustrated embodiment) and the motor 18 is driven at the cooling speed for the time increment $t_i$ to reduce the roasting temperature in a relatively abrupt fashion, as shown at block 276. The control process then returns to the block 255.

If the roasting temperature T is less than $T_M$, the control 230 next determines if the roasting temperature T exceeds the desired temperature $T_D$ (260° C. in the illustrated embodiment), as shown at the block 264. If the roasting temperature T exceeds the desired temperature $T_D$, the control 230 then determines whether the temperature control cooling mode has already been initiated, as shown at the block 278. If the cooling mode has not been initiated, the control 230 initiates the temperature control cooling mode by driving the motor 18 at the cooling speed while the electric heater 34 is energized, as shown at 280 and 282, and then returns to the block 255. If the temperature control cooling mode has already been initiated, the control determines whether the cooling time period $t_c$ has expired, as shown at the block 284. If the cooling time period $t_c$ has not expired, the motor 18 is maintained at the cooling speed, while the heater is energized, as shown at the block 282. If the cooling time period $t_c$ has expired, the temperature control cooling mode is cleared by driving the motor at the normal operating speed and de-energizing the heater 34 for one time increment $t_i$ to further reduce the roasting temperature T, as shown at 286, and the control process returns to the block 255.

Returning to the block 264, if the roasting temperature T does not exceed the desired roasting temperature $T_D$, the control 230 determines whether the temperature control cooling mode is currently active, as shown at the block 288. If the temperature control cooling mode is not currently active, the motor 18 is driven at the normal operating speed and the heater 34 is energized, as shown at blocks 289 and 290, and the control process returns to the block 255. If the temperature control cooling mode is currently active, the control 230 determines whether the roasting temperature T is less than a lower temperature limit $T_L$ (256° C. in the illustrated embodiment), as shown at the block 266. If the roasting temperature is less than the lower temperature limit $T_L$, the temperature control cooling mode is deactivated by driving the motor 18 at the normal operating speed with the heater 34 energized, as shown at blocks 292 and 290, respectively. If the roasting temperature T is not less than $T_L$, the control 230 determines whether the cooling time period $t_c$ has expired, as shown at the block 294. If the cooling period $t_c$ has not expired, the temperature control cooling mode is maintained by driving the motor 18 at the cooling speed with the heater 34 energized, as shown at the block 296, and the control process returns to the block 255. If the cooling period $t_c$ has expired, the temperature control cooling mode is terminated by driving the motor 18 at the normal operating speed, with the heater 34 energized, as shown at the block 298. The control then returns to the block 255.

It will be appreciated that the use of the "fan based" temperature control allows for a more accurate control of the roasting temperature T in comparison to simply energizing and de-energizing the electrical heater 34 to control the roasting temperature T because of the thermal inertia typically associated with such electrical heaters 34. Further, it will be appreciated that the use of the "fan based" temperature control increases the operational life of the heater relay 246 by minimizing the opening and closing of the relay 246.

What is claimed is:

1. A roasting chamber for roasting coffee beans comprising:
   a bottom including at least one air inlet opening to create a substantially vertical air stream into the roasting chamber;
   a diverter located above the bottom in a position that is centered in said vertical air stream to redirect coffee beans moving upwardly in said vertical air stream toward a location in the roasting chamber that is remote from said at least one air inlet opening; and
   at least one guide surface to guide said redirected coffee beans back toward said at least one air inlet opening.

2. The roasting chamber of claim 1 wherein said bottom is planar and said at least one guide surface comprises a slant surface that slants downwardly to said planar bottom.

3. The roasting chamber of claim 2 wherein said at least one guide surface further comprises a vertically extending outer wall and wherein said slant surface slants downwardly from said outer wall to said bottom.

4. The roasting chamber of claim 2 wherein said bottom and said slant surface are a part of a unitary component.

5. The roasting chamber of claim 2 wherein said slant surface is defined by a frusto-conical wall that blends into said planar bottom.

6. The roasting chamber of claim 2 wherein said at least one air inlet opening comprises a first plurality of circular holes of a first diameter and a second plurality of circular holes of a second diameter larger than said first diameter, with said second plurality of circular holes nominally located at an intersection between said planar bottom and said slant surface.

7. The roasting chamber of claim 1 in combination with:
   a housing having an air inlet, the roasting chamber mounted to the housing;
   an electric motor mounted within the housing;
   a fan in fluid communication with the roasting chamber and driven by the electric motor to create a roasting air stream to the at least one air inlet opening of the roasting chamber;
   an electric heater within the housing to heat the roasting air stream prior to the roasting airstream entering the roasting chamber; and
   a control for said motor, including a temperature sensor located in the roasting air stream downstream of the heater, the control operative to power the motor at a cooling speed in response to the sensor detecting a temperature greater than an upper temperature limit and to power the motor at a normal operating speed in response to the sensor detecting a temperature less than a lower temperature limit, the normal operating speed being less than the cooling speed.

8. A roasting chamber for roasting coffee beans comprising:
   an outer wall in the shape of a body of revolution about a vertical axis;
   a base including a planar bottom and an upwardly opening, frusto-conical side wall extending from the planar bottom to the outer wall, the bottom and the side wall nominally centered on the vertical axis, the base further including at least one air inlet opening extending through at least one of the bottom and the sidewall; and
   a mushroom-shaped diverter extending upwardly from the planar bottom, nominally centered on the vertical axis.

9. The roasting chamber of claim 8 wherein the diverter including a stem that blends into a conical-shaped head portion, with the stem and the head portion nominally centered on the vertical axis.

10. The roasting chamber of claim 8 wherein the at least one air inlet opening comprises a plurality of circular holes formed in the bottom to create a substantially vertical airstream into the roasting chamber around the diverter.

11. The roasting chamber of claim 8 in combination with:
    a housing having an air inlet, the roasting chamber mounted to the housing;
    an electric motor mounted within the housing;
    a fan in fluid communication with the roasting chamber and driven by the electric motor to create a roasting air stream to the at least one air inlet opening of the roasting chamber;
    an electric heater within the housing to heat the roasting air stream prior to the roasting airstream entering the roasting chamber; and
    a control for said motor, including a temperature sensor located in the air stream downstream of the heater, the control operative to power the motor at a cooling speed in response to the sensor detecting a temperature greater than an upper temperature limit and to power the motor at a normal operating speed in response to the sensor detecting a temperature less than a lower temperature limit, the normal operating speed being less than the cooling speed.

12. Apparatus for roasting coffee beans comprising:
    a coffee bean roasting chamber including an upper portion defined by a nominally cylindrical wall that terminates in a nominally circular lip that surrounds an open top of the roasting chamber; and
    a cover for the open top of the roasting chamber, the cover including a preformed resilient seal having a nominally cylindrical portion that blends into a nominally planer portion that extends radially from the cylindrical portion, the cylindrical portion adapted to form a seal with the cylindrical wall and the planer portion adapted to form a seal with the circular lip with the cover installed on the roasting chamber.

13. A roasting chamber for roasting coffee beans comprising:

a vessel defined by an outer wall in the shape of a body of revolution about a vertical axis, the outer wall including a radially inwardly extending annular shoulder, the vessel having an open bottom;

a metallic base mounted within the open bottom of the vessel and having an outer periphery abutting the shoulder, the base including at least one inlet for the introduction of a hot air stream into the vessel; and a plastic mount ring fastened to the metallic base to clamp the shoulder of the vessel between the metallic base and the mount ring thereby assembling the vessel, the metallic base and the mount ring into an integral unit.

14. The roasting chamber of claim 13 further comprising a conforming, resilient seal between the outer periphery of the metallic base and at least one of the shoulder and the interior surface of the outer wall of the vessel.

15. A hull collector for a hot air coffee roasting apparatus to collect hulls and other chaff produced by the roasting of coffee beans in the coffee roasting apparatus, the hull collector comprising:

a body defining a collection area for hulls and other chaff produced by the roasting of coffee beans;

a hot air inlet to the body for the hot air stream used in the roasting of coffee beans;

a hot air outlet from the body for the hot air stream used in the roasting of coffee beans;

a first filter positioned in the body between the hot air outlet and the hot air inlet and having openings of a first size to filter a first size of hulls and other chaff from the hot air stream as the hot air stream flows from the hot air inlet to the hot air outlet; and a second filter positioned between the first filter and the hot air outlet and having openings of a second size smaller than said first size to filter a second size smaller than said first size of hulls and other chaff from the hot air stream as the hot air stream flows from the first filter to the hot air outlet, whereby said first filter inhibits larger hulls and other chaff from clogging said second filter, and said second filter inhibits smaller hulls and other chaff from exiting the hot air outlet.

* * * * *